United States Patent Office.

FRANK DE CONINCK, OF SAN FRANCISCO, CALIFORNIA.

ASBESTUS PAINT.

SPECIFICATION forming part of Letters Patent No. 389,641, dated September 18, 1888.

Application filed March 19, 1888. Serial No. 267,729. (No spe. imens.)

*To all whom it may concern:*

Be it known that I, FRANK DE CONINCK, a citizen of the United States, residing at 102 Ellis street, San Francisco, California, have invented a new and useful Incombustible Paint; and I do hereby declare that the following is a full, clear, and exact description of the invention, which will enable others skilled in the art to which it appertains to make and use the same.

Heretofore "asbestus" has been turned into fabrics, plasters, or felted sheets more or less thick.

The aim of my invention is to spread over cloths and woods, in accordance with their thickness, one or successive even incombustible coats of pulverized asbestus sixty-five grams to the yard square by means of a paint, and so make them absolutely and permanently uninflammable.

To carry my invention into effect I clean, pulverize, and sift the asbestus to an impalpable powder. Then I mix, by weight, two parts and a quarter of the powder to one part of oxide of zinc. Next I mingle, also by weight, a solution composed of, first, thirty parts of a solution of chloride of zinc at 56° Baumé; second, fifty parts of a solution of borate of ammonia at 3° Baumé; third, twenty parts of a warm solution of gelatine containing twenty-five per cent. of dry glue as found in trade. Then I take forty parts of the former mixture and sixty parts of the latter solution and mix the same together until it is liquid enough to be applied as a paint with a brush.

It will be manifest that the products used in connection with pulverized asbestus may be substituted or varied by equivalents and the quantity of asbestus increased or lessened, according to protection needed; but I have fitted them to protect all kind of cloths by one coat of paint and the most usual thickness of wood by two coats of paint.

Among the striking properties of my paint I point out its absolute incombustibility, preserved indefinitely, and its perfect adherence to cloths, woods, theatrical decorations, and like materials. Moreover, it does not crack, blister, nor peel off in scale or dust by alternate or uninterrupted warmth or humidity, and does not injure any property of wood, nor damage fibers of cloths nor colors applied over it.

Having fully described my invention, what I desire to claim and secure by Letters Patent of the United States is—

A compound consisting of pulverized asbestus, oxide of zinc, chloride of zinc, borate of ammonia, and gelatine, in the proportions and for the purposes specified.

FRANK DE CONINCK.

Witnesses:
H. LANG,
A. GRAY.